(12) United States Patent
Srinivasa et al.

(10) Patent No.: US 11,755,331 B2
(45) Date of Patent: Sep. 12, 2023

(54) WRITEBACK HAZARD ELIMINATION USING A PLURALITY OF TEMPORARY RESULT-STORAGE ELEMENTS

(71) Applicant: APPLE INC., Cupertino, CA (US)

(72) Inventors: Skanda K Srinivasa, Austin, TX (US); Christopher S Thomas, Austin, TX (US)

(73) Assignee: APPLE INC., Cupertino, CA (US)

( * ) Notice: Subject to any disclaimer, the term of this patent is extended or adjusted under 35 U.S.C. 154(b) by 71 days.

(21) Appl. No.: 17/372,465

(22) Filed: Jul. 11, 2021

(65) Prior Publication Data

US 2023/0011446 A1    Jan. 12, 2023

(51) Int. Cl.
*G06F 9/38* (2018.01)
*G06F 1/10* (2006.01)

(52) U.S. Cl.
CPC .............. *G06F 9/3867* (2013.01); *G06F 1/10* (2013.01); *G06F 9/3826* (2013.01); *G06F 9/3857* (2013.01)

(58) Field of Classification Search
CPC .............................. G06F 9/3826; G06F 9/3857
See application file for complete search history.

(56) References Cited

U.S. PATENT DOCUMENTS

| 5,222,240 A * | 6/1993 | Patel ...................... G06F 9/3867 |
| | | 712/E9.046 |
| 5,604,878 A | 2/1997 | Colwell et al. | |
| 5,826,055 A * | 10/1998 | Wang .................... G06F 9/3836 |
| | | 712/23 |
| 5,870,581 A * | 2/1999 | Redford ................ G06F 9/3824 |
| | | 711/149 |
| 7,478,225 B1 | 1/2009 | Brooks et al. | |
| 10,372,500 B1 * | 8/2019 | Thomas ................ G06F 9/5055 |
| 2007/0050610 A1 * | 3/2007 | Tran .................... G06F 9/30072 |
| | | 712/E9.079 |

(Continued)

OTHER PUBLICATIONS

Park, I et al., "Reducing register ports for higher speed and lower energy," MICRO-35, Proceedings, 2002, pp. 171-182 [online], [retrieved on Nov. 14, 2022]. Retrieved from the Internet <URL: https://ieeexplore.ieee.org/document/1176248> < doi: 10.1109/MICRO.2002.1176248>.*

*Primary Examiner* — Shawn Doman
(74) *Attorney, Agent, or Firm* — KLIGLER & ASSOCIATES PATENT ATTORNEYS LTD

(57) ABSTRACT

A processor includes a processing pipeline, a plurality of result-storage elements, and writeback logic. The processing pipeline is configured to process program operations and to write, to a result storage, up to a predefined maximal number of results of the processed program operations per clock cycle. The result-storage elements are configured to store respective ones of the results. The writeback logic is configured to (i) detect a writeback conflict event in which the processing pipeline produces simultaneous results that exceed the predefined maximal number of results, for writing to the result storage, in a same clock cycle, (ii) in response to detecting the writeback conflict event, to temporarily store at least a given result, from among the simultaneous results, in a given result-storage element, and (iii) to subsequently write the temporarily-stored given result from the given result-storage element to the result storage.

15 Claims, 6 Drawing Sheets

(56) References Cited

U.S. PATENT DOCUMENTS

| | | | |
|---|---|---|---|
| 2015/0039862 A1* | 2/2015 | Barowski | G06F 9/30145 |
| | | | 712/218 |
| 2016/0253175 A1* | 9/2016 | Jackson | G06F 9/3838 |
| | | | 712/217 |
| 2017/0364473 A1* | 12/2017 | Singh | G06F 15/177 |
| 2019/0243646 A1 | 8/2019 | Anderson | |
| 2022/0237020 A1* | 7/2022 | Brewer | G06F 9/48 |

* cited by examiner

WRITEBACK HAZARD ELIMINATION USING A PLURALITY OF TEMPORARY RESULT-STORAGE ELEMENTS

FIELD OF THE DISCLOSURE

The present disclosure relates generally to processor design, and particularly to methods and apparatus for mitigating writeback conflicts in processors.

BACKGROUND

In some processors, a writeback conflict may occur in the processor pipeline when two or more instructions become ready for writeback at the same time. Various techniques for avoiding or mitigating writeback conflicts are known in the art.

For example, U.S. Pat. No. 7,478,225 describes techniques to support pipelining of variable-latency instructions in a multithreaded processor. In one embodiment, a processor may include instruction fetch logic configured to issue a first and a second instruction from different ones of a plurality of threads during successive cycles. The processor may also include first and second execution units respectively configured to execute shorter-latency and longer-latency instructions and to respectively write shorter-latency or longer-latency instruction results to a result write port during a first or second writeback stage. The first writeback stage may occur a fewer number of cycles after instruction issue than the second writeback stage. The instruction fetch logic may be further configured to guarantee result write port access by the second execution unit during the second writeback stage by preventing the shorter-latency instruction from issuing during a cycle for which the first writeback stage collides with the second writeback stage.

U.S. Pat. No. 5,604,878 describes techniques that implement pipeline lengthening in functional units likely to be involved in a writeback conflict. Logic circuitry is provided for comparing the depths of two concurrently executing execution units to determine if a conflict will develop. When it appears that two execution units will attempt to write back at the same time, the execution unit having a shorter pipeline will be instructed to add a stage to its pipeline, storing its result in a delaying buffer for one clock cycle. After the conflict has been resolved, the instruction to lengthen the pipeline of a given functional unit will be rescinded.

SUMMARY

An embodiment that is described herein provides a processor including a processing pipeline, a plurality of result-storage elements, and writeback logic. The processing pipeline is configured to process program operations and to write, to a result storage, up to a predefined maximal number of results of the processed program operations per clock cycle. The result-storage elements are configured to store respective ones of the results. The writeback logic is configured to (i) detect a writeback conflict event in which the processing pipeline produces simultaneous results that exceed the predefined maximal number of results, for writing to the result storage, in a same clock cycle, (ii) in response to detecting the writeback conflict event, to temporarily store at least a given result, from among the simultaneous results, in a given result-storage element, and (iii) to subsequently write the temporarily-stored given result from the given result-storage element to the result storage.

In some embodiments, the writeback logic is configured to retain the given result in the given result-storage element at least until the given result is written back from the given result-storage element to the result storage. In an embodiment, the writeback logic is configured to assign the result-storage elements for storage of simultaneous results using Round-Robin scheduling. In a disclosed embodiment, the simultaneous results are results of two or more operations that differ in processing latency in the processing pipeline.

In an example embodiment, the writeback logic includes multiplexing circuitry, which is configured to receive as inputs at least (i) one or more results from one or more execution units of the processing pipeline, and (ii) one or more of the temporarily-stored results from the result-storage elements, and selection logic, configured to control the multiplexing circuitry to select, in a given clock cycle, one of the inputs for writing to the result storage.

In some embodiments, the writeback logic is configured to identify an operation that is processed in the processing pipeline and requires an input that is available in the result-storage elements, and to provide the input to the operation from the result-storage elements. In an embodiment, the writeback logic is configured to determine a time window during which the input will be available in the result-storage elements, to determine a time at which the operation will require the input, and, if the time falls within the time window, to provide the input from the result-storage elements.

There is additionally provided, in accordance with an embodiment that is described herein, a method including, in a processing pipeline of a processor, processing program operations and writing, to a result storage, up to a predefined maximal number of results of the processed program operations per clock cycle. A writeback conflict event is detected, in which the processing pipeline produces simultaneous results that exceed the predefined maximal number of results for writing to the result storage in a same clock cycle. In response to detecting the writeback conflict event, at least a given result, from among the simultaneous results, is temporarily stored in a given result-storage element selected from among multiple result-storage elements. The temporarily-stored given result is subsequently written from the given result-storage element to the result storage.

There is further provided, in accordance with an embodiment that is described herein, a system including a plurality of interconnected processors. At least one of the processors includes a processing pipeline, a plurality of result-storage elements, and writeback logic. The processing pipeline is configured to process program operations and to write, to a result storage, up to a predefined maximal number of results of the processed program operations per clock cycle. The result-storage elements are configured to store respective ones of the results. The writeback logic is configured to (i) detect a writeback conflict event in which the processing pipeline produces simultaneous results that exceed the predefined maximal number of results, for writing to the result storage, in a same clock cycle, (ii) in response to detecting the writeback conflict event, to temporarily store at least a given result, from among the simultaneous results, in a given result-storage element, and (iii) to subsequently write the temporarily-stored given result from the given result-storage element to the result storage. In an embodiment, the plurality of interconnected processors are implemented as a System-on-Chip (SOC). In an embodiment, the system further includes a display device and one or more input devices.

The present disclosure will be more fully understood from the following detailed description of the embodiments thereof, taken together with the drawings in which:

DETAILED DESCRIPTION OF EMBODIMENTS

Overview

Figure 1:
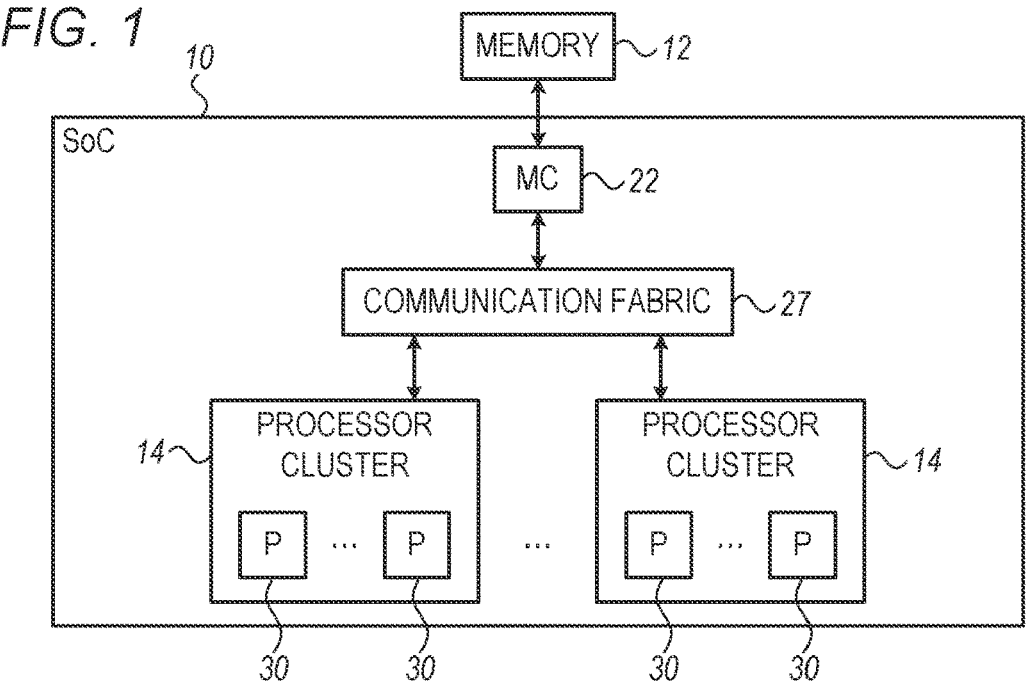
FIG. 1 is a block diagram that schematically illustrates a computing system implemented as a System-on-Chip (SOC), in accordance with an embodiment that is described herein.

A typical processor includes a processing pipeline that, among other tasks, fetches, decodes and executes program operations ("ops"). The results of executed ops are written to a register file or other result storage—This operation is referred to as "writeback". In some cases, e.g., when different ops may differ in processing latency in the pipeline, writeback conflicts may occur.

In a pipeline that is capable of one writeback operation per cycle ("a pipeline having a single writeback port"), a writeback conflict occurs when results of two or more ops become ready to be written to the result storage in the same clock cycle. More generally, the pipeline can be characterized as being able to write up to a predefined maximal number of results to the result storage per clock cycle. This number, which can be a single result or multiple results, is referred to as the number of writeback ports of the pipeline. In this context, the term "writeback conflict" refers to an event in which the number of ops that become ready for writeback exceeds the number of writeback ports of the pipeline.

Embodiments that are described herein provide improved methods and apparatus for eliminating writeback conflicts in processors.

In some disclosed embodiments, a processor includes, in addition to a processing pipeline, a plurality of result-storage elements and writeback logic. Each result-storage element is capable of storing a respective result of a program op. The writeback logic uses the result-storage elements for temporary storage of results that are ready for writeback, in order to eliminate writeback conflicts. In some embodiments, upon detecting a writeback conflict between two or more "simultaneous results" (i.e., results that become ready for writeback in the same clock cycle), the writeback logic temporarily stores at least one of the simultaneous results in the result-storage elements. The writeback logic subsequently writes the temporarily-stored results from the result-storage elements to the result storage.

The embodiments described herein refer to writeback to a register file. The disclosed techniques, however, are not limited to register files and may be used in processors having any other suitable result storage structures. The description that follows will refer to a register file, by way of example.

It can be shown that temporary storage of this sort eliminates writeback conflicts completely, provided that the number of result-storage elements is equal to or greater than the maximum possible difference in processing latency (in clock cycles) between ops. This requirement, however, is not always mandatory—in some cases it is possible to achieve complete elimination of writeback conflicts with a smaller number of result-storage elements.

In particular, in the disclosed embodiments, once a given result is written to a given result-storage element, the writeback logic does not shift or copy the given result to any other result-storage element. In other words, a given result is written to the register file from the same result-storage element it was originally written to from the pipeline. The writeback logic may assign result-storage elements for storage of simultaneous results using Round-Robin scheduling, for example.

Retaining a result in the same result-storage element, as opposed to shifting, conserves power. In one example implementation involving 128-bit floating-point results, the power saving is on the order of 1.5 mW per result.

System Description

FIG. 1 is a block diagram that schematically illustrates a computing system implemented as a System-on-Chip (SOC) 10, in accordance with an embodiment that is described herein. SOC 10 is shown coupled to a memory 12. As implied by the name, the components of SOC 10 may be integrated onto a single semiconductor substrate as an integrated circuit "chip." In some embodiments, the components may be implemented on two or more discrete chips in a system. However, SOC 10 will be used as an example herein. In the illustrated embodiment, the components of SOC 10 include a plurality of processor clusters 14, a Memory Controller (MC) 22, a communication fabric 27, and optionally one or more peripheral components (more briefly, "peripherals"—not shown in the figure). Processor clusters 14 and MC 22 may all be coupled to communication fabric 27.

Memory controller 22 may be coupled to memory 12 during use. In some embodiments, there may be more than one memory controller coupled to corresponding memory. The memory address space may be mapped across the memory controllers in any desired fashion. In the illustrated embodiment, processor clusters 14 may include respective pluralities of processors (P) 30. Processors 30 may form the central processing units (CPU(s)) of SOC 10. In an embodiment, one or more processor clusters 14 may not be used as CPUs.

As mentioned above, processor clusters 14 may include one or more processors 30 that may serve as the CPU of the SOC 10. The CPU of the system includes the processor(s) that execute the main control software of the system, such as an operating system. Generally, software executed by the CPU during use may control the other components of the system to realize the desired functionality of the system. The processors may also execute other software, such as application programs. The application programs may provide user functionality, and may rely on the operating system for lower-level device control, scheduling, memory management, etc. Accordingly, the processors may also be referred to as application processors.

Generally, a processor may include any circuitry and/or microcode configured to execute instructions defined in an instruction set architecture (ISA) implemented by the processor. Processors may encompass processor cores implemented on an integrated circuit with other components as a system on a chip (SOC 10) or other levels of integration. Processors may further encompass discrete microprocessors, processor cores and/or microprocessors integrated into multichip module implementations, processors implemented as multiple integrated circuits, etc.

Memory controller 22 may generally include the circuitry for receiving memory operations from the other components of SOC 10 and for accessing memory 12 to complete the memory operations. Memory controller 22 may be configured to access any type of memory 12. For example, memory 12 may be static random access memory (SRAM), dynamic RAM (DRAM) such as synchronous DRAM (SDRAM) including double data rate (DDR, DDR2, DDR3, DDR4, etc.) DRAM. Low power/mobile versions of the DDR DRAM may be supported (e.g. LPDDR, mDDR, etc.). Memory controller 22 may include queues for memory operations, for ordering (and potentially reordering) the operations and presenting the operations to memory 12. Memory controller 22 may further include data buffers to store write data awaiting write to memory and read data awaiting return to the source of the memory operation. In some embodiments, memory controller 22 may include a memory cache to store recently accessed memory data. In SOC implementations, for example, the memory cache may reduce power consumption in the SOC by avoiding re-access of data from memory 12 if the data is expected to be accessed again soon. In some cases, the memory cache may also be referred to as a system cache, as opposed to private caches such as an L2 cache or caches in the processors, which serve only certain components. Additionally, in some embodiments, a system cache need not be located within memory controller 22.

Peripherals in SOC 10 may be any set of additional hardware functionality included in the SOC. For example, the peripherals may include video peripherals such as an image signal processor configured to process image capture data from a camera or other image sensor, GPUs, video encoder/decoders, scalers, rotators, blenders, display controller, etc. The peripherals may include audio peripherals such as microphones, speakers, interfaces to microphones and speakers, audio processors, digital signal processors, mixers, etc. The peripherals may include interface controllers for various interfaces external to SOC 10 including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

Communication fabric 27 may be any communication interconnect and protocol for communicating among the components of SOC 10. Communication fabric 27 may be bus-based, including shared bus configurations, cross bar configurations, and hierarchical buses with bridges. Communication fabric 27 may also be packet-based, and may be hierarchical with bridges, cross bar, point-to-point, or other interconnects.

It is noted that the number of components of SOC 10 (and the number of subcomponents for those shown in FIG. 1), such as processors 30 in each processor cluster 14, may vary from embodiment to embodiment. Additionally, the number of processors 30 in one processor cluster 14 may differ from the number of processors 30 in another processor cluster 14. There may be more or fewer of each component/subcomponent than the number shown in FIG. 1.

Figure 2:
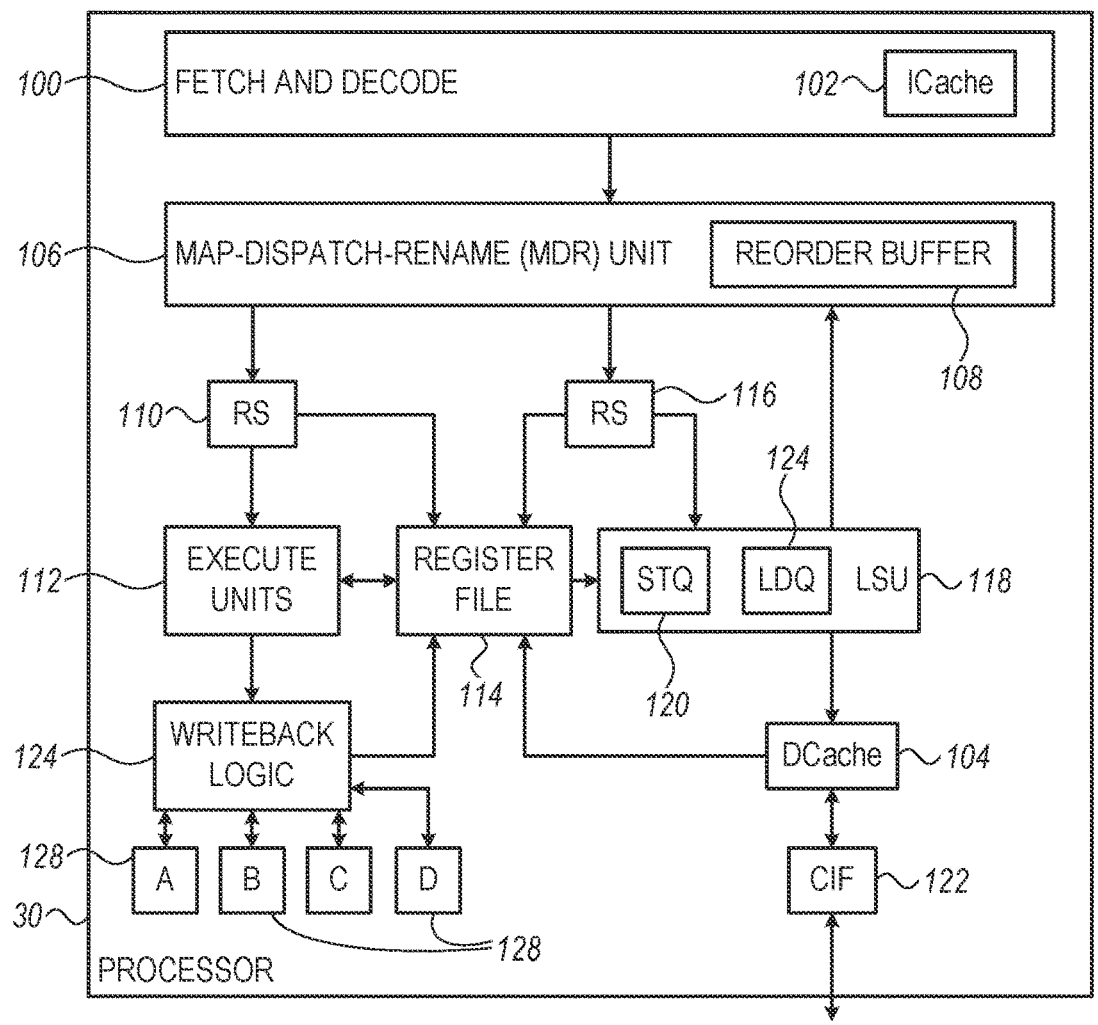
FIG. 2 is a block diagram that schematically illustrates a processor in the SOC of FIG. 1, in accordance with an embodiment that is described herein.

FIG. 2 is a block diagram that schematically illustrates an example processor 30 in SOC 10 of FIG. 1 in greater detail, in accordance with an embodiment that is described herein. In the illustrated embodiment, processor 30 includes a fetch and decode unit 100. Fetch and decode unit 100 includes an instruction cache (ICache) 102.

Processor 30 further includes a map-dispatch-rename (MDR) unit 106 (which in turn includes a reorder buffer 108), one or more reservation stations (RS) 110, one or more execute units 112, a register file 114, a data cache (DCache) 104, a load/store unit (LSU) 118, a reservation station (RS) 116 for the load/store unit, and a core interface unit (CIF) 122. Fetch and decode unit 100 is coupled to MDR unit 106, which is coupled to reservation stations 110, reservation station 116, and LSU 118. Reservation stations 110 are coupled to execution units 112. Register file 114 is coupled to execute units 112 and LSU 118. LSU 118 is also coupled to DCache 104, which is coupled to CIF 122 and register file 114. LSU 118 includes a store queue (STQ) 120, and a load queue (LDQ) 124.

Fetch and decode unit 100 may be configured to fetch instructions for execution by processor 30 and decode the instructions into ops for execution. More particularly, fetch and decode unit 100 may be configured to cache instructions previously fetched from memory (through CIF 122) in ICache 102, and may be configured to fetch a speculative path of instructions for processor 30. Fetch and decode unit 100 may implement various prediction structures to predict the fetch path. For example, a next fetch predictor may be used to predict fetch addresses based on previously executed instructions. Branch predictors of various types may be used to verify the next fetch prediction, or may be used to predict next fetch addresses if the next fetch predictor is not used. Fetch and decode unit 100 may be configured to decode the instructions into instruction operations.

In some embodiments, a given instruction may be decoded into one or more instruction operations, depending on the complexity of the instruction. Particularly complex instructions may be microcoded, in some embodiments. In such embodiments, the microcode routine for the instruction may be coded in instruction operations. In other embodiments, each instruction in the ISA implemented by processor 30 may be decoded into a single instruction operation, and thus the instruction operation may be essentially synonymous with instruction (although it may be modified in form by the decoder). The term "instruction operation" may be more briefly referred to herein as "op."

MDR unit 106 may be configured to map the ops to speculative resources (e.g., physical registers) to permit out-of-order and/or speculative execution, and may dispatch the ops to reservation stations 110 and 116. The ops may be mapped to physical registers in register file 114 from the architectural registers used in the corresponding instructions. That is, register file 114 may implement a set of physical registers that may be greater in number than the architected registers specified by the instruction set architecture implemented by processor 30. MDR unit 106 may manage the mapping of the architected registers to physical registers. There may be separate physical registers for different operand types (e.g., integer, media, floating point, etc.) in an embodiment. In other embodiments, the physical registers may be shared over operand types. MDR unit 106 may also be responsible for tracking the speculative execution and retiring ops or flushing misspeculated ops. Reorder buffer 108 may be used to track the program order of ops and manage retirement/flush. That is, reorder buffer 108 may be configured to track a plurality of instruction operations corresponding to instructions fetched by the processor and not retired by the processor.

Ops may be scheduled for execution when the source operands for the ops are ready. In the illustrated embodiment, decentralized scheduling is used for each of execution units 112 and the LSU 118, e.g., in reservation stations 116 and 110. Other embodiments may implement a centralized scheduler if desired.

LSU 118 may be configured to execute load/store memory ops. Generally, a memory operation (memory op) may be an instruction operation that specifies an access to memory (although the memory access may be completed in a cache such as DCache 104). A load memory operation may specify a transfer of data from a memory location to a register, while a store memory operation may specify a transfer of data from a register to a memory location. Load memory operations may be referred to as load memory ops, load ops, or loads; and store memory operations may be referred to as store memory ops, store ops, or stores.

In an embodiment, store ops may be executed as a store address op and a store data op. The store address op may be defined to generate the address of the store, to probe the cache for an initial hit/miss determination, and to update the store queue with the address and cache info. Thus, the store address op may have the address operands as source operands. The store data op may be defined to deliver the store data to the store queue. Thus, the store data op may not have the address operands as source operands, but may have the store data operand as a source operand. In many cases, the address operands of a store may be available before the store data operand, and thus the address may be determined and made available earlier than the store data.

In some embodiments, it may be possible for the store data op to be executed before the corresponding store address op, e.g., if the store data operand is provided before one or more of the store address operands. While store ops may be executed as store address and store data ops in some embodiments, other embodiments may not implement the store address/store data split. The address generated via execution of the store address op may be referred to as an address corresponding to the store op.

Load/store ops may be received in reservation station 116, which may be configured to monitor the source operands of the operations to determine when they are available and then issue the operations to the load or store pipelines, respectively. Some source operands may be available when the operations are received in reservation station 116, which may be indicated in the data received by reservation station 116 from MDR unit 106 for the corresponding operation. Other operands may become available via execution of operations by other execution units 112 or even via execution of earlier load ops. The operands may be gathered by reservation station 116, or may be read from register file 114 upon issue from reservation station 116 as shown in FIG. 2.

In an embodiment, reservation station 116 may be configured to issue load/store ops out of order (from their original order in the code sequence being executed by processor 30, referred to as "program order") as the operands become available. To ensure that there is space in LDQ 124 or STQ 120 for older operations that are bypassed by younger operations in reservation station 116, MDR unit 106 may include circuitry that preallocates LDQ 124 or STQ 120 entries to operations transmitted to load/store unit 118. If there is not an available LDQ entry for a load being processed in MDR unit 106, MDR unit 106 may stall dispatch of the load op and subsequent ops in program order until one or more LDQ entries become available. Similarly, if there is not a STQ entry available for a store, MDR unit 106 may stall op dispatch until one or more STQ entries become available. In other embodiments, reservation station 116 may issue operations in program order and LRQ 46/STQ 120 assignment may occur at issue from reservation station 116.

LDQ 124 may track loads from initial execution to retirement by LSU 118. LDQ 124 may be responsible for ensuring the memory ordering rules are not violated (between out of order executed loads, as well as between loads and stores). If a memory ordering violation is detected, LDQ 124 may signal a redirect for the corresponding load. A redirect may cause processor 30 to flush the load and subsequent ops in program order, and refetch the corresponding instructions. Speculative state for the load and subsequent ops may be discarded and the ops may be refetched by fetch and decode unit 100 and reprocessed to be executed again.

When a load/store address op is issued by reservation station 116, LSU 118 may be configured to generate the address accessed by the load/store, and may be configured to translate the address from an effective or virtual address created from the address operands of the load/store address op to a physical address actually used to address memory. LSU 118 may be configured to generate an access to DCache 104. For load operations that hit in DCache 104, data may be speculatively forwarded from DCache 104 to the destination operand of the load operation (e.g., a register in register file 114), unless the address hits a preceding operation in STQ 120 (that is, an older store in program order) or the load is replayed.

The data may also be forwarded to dependent ops that were speculatively scheduled and are in the execution units 112. The execution units 112 may bypass the forwarded data in place of the data output from register file 114, in such cases. If the store data is available for forwarding on a STQ hit, data output by STQ 120 may forwarded instead of cache data. Cache misses and STQ hits where the data cannot be forwarded may be reasons for replay and the load data may not be forwarded in those cases. The cache hit/miss status from DCache 104 may be logged in STQ 120 or LDQ 124 for later processing.

LSU 118 may implement multiple load pipelines. For example, in an embodiment, three load pipelines ("pipes") may be implemented, although more or fewer pipelines may be implemented in other embodiments. Each pipeline may execute a different load, independent and in parallel with other loads. That is, RS 116 may issue any number of loads up to the number of load pipes in the same clock cycle. LSU 118 may also implement one or more store pipes, and in particular may implement multiple store pipes. The number of store pipes need not equal the number of load pipes, however. In an embodiment, for example, two store pipes may be used. Reservation station 116 may issue store address ops and store data ops independently and in parallel to the store pipes. The store pipes may be coupled to STQ 120, which may be configured to hold store operations that have been executed but have not committed.

CIF 122 may be responsible for communicating with the rest of a system including processor 30, on behalf of processor 30. For example, CIF 122 may be configured to request data for DCache 104 misses and ICache 102 misses. When the data is returned, CIF 122 may signal the cache fill to the corresponding cache. For DCache fills, CIF 122 may also inform LSU 118. LDQ 124 may attempt to schedule replayed loads that are waiting on the cache fill so that the replayed loads may forward the fill data as it is provided to DCache 104 (referred to as a fill forward operation). If the replayed load is not successfully replayed during the fill, the replayed load may subsequently be scheduled and replayed through DCache 104 as a cache hit. CIF 122 may also writeback modified cache lines that have been evicted by DCache 104, merge store data for non-cacheable stores, etc.

Execution units 112 may include any types of execution units in various embodiments. For example, execution units 112 may include integer, floating point, and/or vector execution units. Integer execution units may be configured to execute integer ops. Generally, an integer op is an op which performs a defined operation (e.g., arithmetic, logical, shift/rotate, etc.) on integer operands. Integers may be numeric values in which each value corresponds to a mathematical integer. The integer execution units may include branch processing hardware to process branch ops, or there may be separate branch execution units.

Floating point execution units may be configured to execute floating point ops. Generally, floating point ops may be ops that have been defined to operate on floating point operands. A floating point operand is an operand that is represented as a base raised to an exponent power and multiplied by a mantissa (or significand). The exponent, the sign of the operand, and the mantissa/significand may be represented explicitly in the operand and the base may be implicit (e.g., base 2, in an embodiment).

Vector execution units may be configured to execute vector ops. Vector ops may be used, e.g., to process media data (e.g., image data such as pixels, audio data, etc.). Media processing may be characterized by performing the same processing on significant amounts of data, where each datum is a relatively small value (e.g., 8 bits, or 16 bits, compared to 32 bits to 64 bits for an integer). Thus, vector ops include single instruction-multiple data (SIMD) or vector operations on an operand that represents multiple media data.

Thus, each execution unit 112 may include hardware configured to perform the operations defined for the ops that the particular execution unit is defined to handle. The execution units may generally be independent of each other, in the sense that each execution unit may be configured to operate on an op that was issued to that execution unit without dependence on other execution units. Viewed in another way, each execution unit may be an independent pipe for executing ops. Different execution units may have different execution latencies (e.g., different pipe lengths). Additionally, different execution units may have different latencies to the pipeline stage at which bypass occurs, and thus the clock cycles at which speculative scheduling of depend ops occurs based on a load op may vary based on the type of op and execution unit 112 that will be executing the op.

It is noted that any number and type of execution units 112 may be included in various embodiments, including embodiments having one execution unit and embodiments having multiple execution units.

A cache line may be the unit of allocation/deallocation in a cache. That is, the data within the cache line may be allocated/deallocated in the cache as a unit. Cache lines may vary in size (e.g., 32 bytes, 64 bytes, 128 bytes, or larger or smaller cache lines). Different caches may have different cache line sizes. ICache 102 and DCache 104 may each be a cache having any desired capacity, cache line size, and configuration. There may be more additional levels of cache between the DCache 104/ICache 102 and the main memory, in various embodiments.

At various points, load/store operations are referred to as being younger or older than other load/store operations. A first operation may be younger than a second operation if the first operation is subsequent to the second operation in program order. Similarly, a first operation may be older than a second operation if the first operation precedes the second operation in program order.

In the present context, fetch and decode unit 100, MDR unit 106, RSs 110 and 116, execution units 112 and LSU 118 are referred to collectively as the processing pipeline of processor 30. Processor 30 further includes writeback logic 124, which carries out writeback of results of ops from execution units 112 to register file 114. In particular, writeback logic 124 eliminates writeback conflicts among results that become ready for writeback simultaneously.

For the sake of writeback conflict elimination, processor 30 includes a plurality of temporary result-storage elements 128 (also referred to herein as "TX elements." Each TX element 128 is configured to store a respective result of a program op. TX elements 128 may be implemented, for example, using registers, flip-flips or any other suitable storage elements. In the present example processor 30 includes four TX elements 128 denoted A, B, C and D. The operation of writeback logic 124 and the use of TX elements 128 in eliminating writeback conflict are explained in detail below.

Writeback Conflict Elimination without Data Shifting

Figure 3:
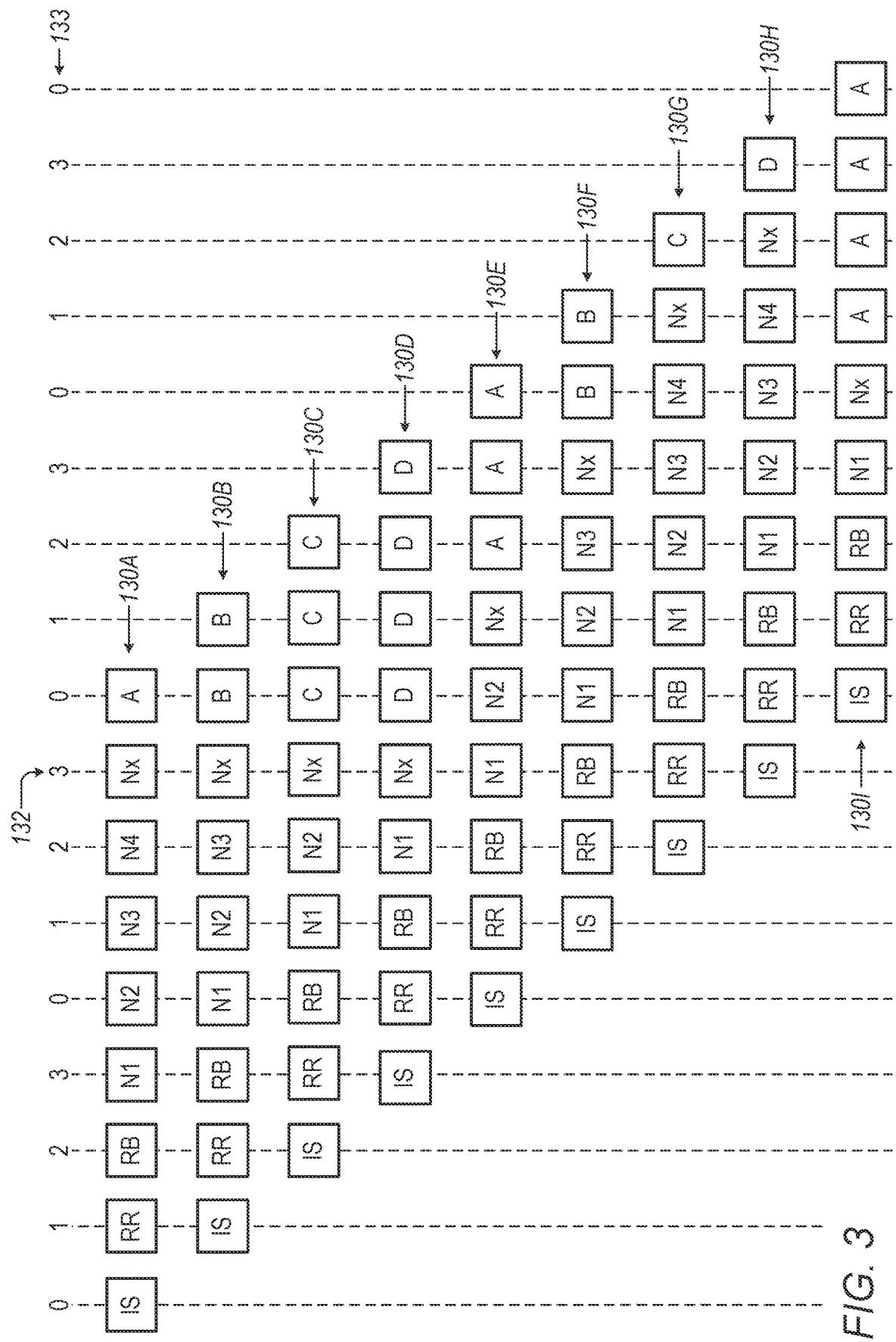
FIG. 3 is a diagram illustrating processing of program operations in the pipeline of the processor of FIG. 2, including mitigation of writeback conflicts, in accordance with an embodiment that is described herein.

FIG. 3 is a diagram illustrating processing of program ops in the processing pipeline of processor 30, including mitigation of writeback conflicts, in accordance with an embodiment that is described herein. The figure illustrates a sequence of ops 130A, 130B, . . . , 130I that are processed by the pipeline. The horizontal axis denotes consecutive clock cycles. Each row in the figure shows the processing of a respective op. The ops being processed may originate from a single thread or from multiple threads.

Each block in the figure represents an operation that is performed by the pipeline as part of processing the respective op. Operations include, for example, issue (IS), readout from the register file (RR), bypass (BP), and execution stages in execution units 112 (N1, N2, . . . , Nx). As seen, the number of execution stages may differ from one op to another. Nx denotes the last execution stage, following which the op is ready for writeback.

In the present example, the results of four ops denoted 130A-130D become ready for writeback simultaneously in a clock cycle denoted 132 (or, in an alternative embodiment, in the following cycle). To mitigate this writeback conflict, in the next clock cycle writeback logic 124 writes the results of ops 130A, 130B, 130C and 130D to respective TX elements 128 (referred to as blocks "A", "B", "C" and "D" in the figure). As seen, each result remains in the same TX element 128 ("A", "B", "C" or "D") for one or more cycles, without shifting.

Subsequently, when possible, writeback logic 124 writes the temporarily-stored results from TX elements 128 to register file 114. In some embodiments, writeback logic 124 writes results from TX elements 128 to register file 114 in accordance with a cyclic time-division schedule defined for the TX elements. Each TX element is assigned a respective slot (typically corresponding to a clock cycle). Logic 124 is permitted to write a result from a TX element to the register file only during the slot assigned to that TX element.

In the example of FIG. 3, a cyclic time-division schedule 133 having four slots ("0", "1", "2" and "3") is shown at the top of the figure. In this example, TX element "A" is assigned slot "0" (i.e., a result can be written-back from TX element "A" to register file 114 only during the slots denoted "0"). Similarly, TX element "B" is assigned slot "1", TX element "C" is assigned slot "2", and TX element "D" is assigned slot "3". While awaiting their assigned slots, temporarily-stored results remain pending in the respective TX elements without shifting.

The example scheduling scheme shown in FIG. 3 is chosen purely by way of example. In alternative embodiments, writeback logic 124 may use any other suitable scheme for writing results from the pipeline to the TX elements, and from the TX elements to the register file.

Figure 4:
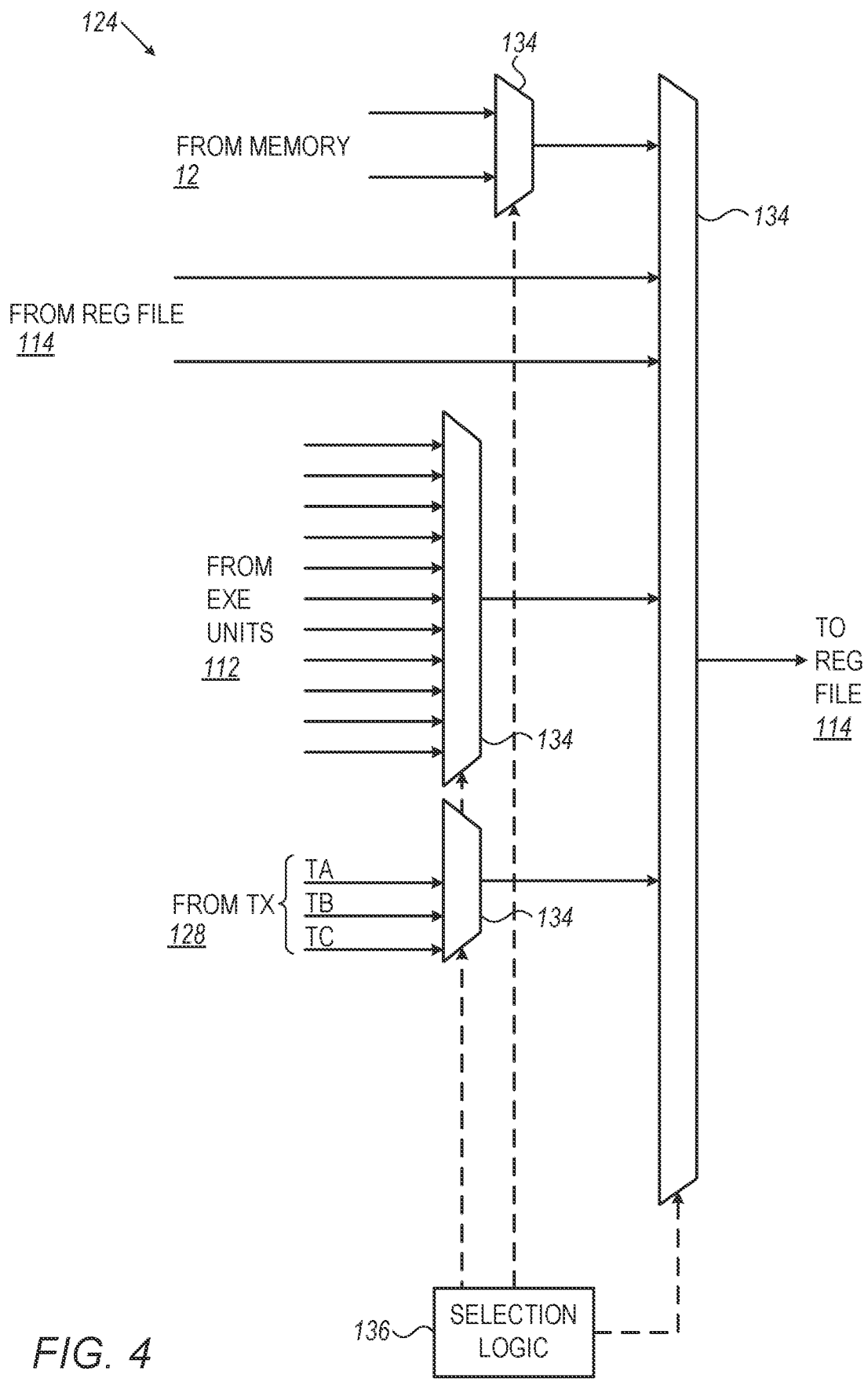
FIG. 4 is a block diagram that schematically illustrates the internal structure of the writeback logic of the processor of FIG. 2, in accordance with an embodiment that is described herein.

FIG. 4 is a block diagram that schematically illustrates the internal structure of writeback logic 124 of processor 30, in accordance with an embodiment that is described herein. In the present example, writeback logic 124 includes a plurality of multiplexers 134 (also referred to collectively as "multiplexing circuitry") and selection logic 136.

Multiplexers 134 receive as inputs at least (i) one or more results of ops from one or more execution units 112 of the processing pipeline of processor 30, and (ii) one or more of the temporarily-stored results from result-storage elements (TX elements) 128. In the example embodiment of FIG. 4, multiplexers 134 receive the following inputs, per clock cycle:

- One or more values (e.g., results of previous ops) read from memory 12. Typically, such values would be provided by LSU 118 (FIG. 2).
- One or more values (e.g., results of previous ops) read from register file 114.
- One or more results of ops provided by one or more execution units 112.
- One or more temporarily-stored results from one or more of TX elements 128 (in the present example, three temporarily-stored results from TX elements TA, TB and TC).

The inputs of multiplexers 134, and the output written to register file 114, may have any suitable word-size (number of bits) and any suitable format. In the present example, the inputs and output are 64-bit words.

In a given clock cycle, selection logic 136 controls multiplexers 134 to select one of the inputs to be written-back to register file 114. In this manner, for example, writeback logic may carry out the writeback scheme of FIG. 3 above, writing-back values from the pipeline or from the temporary result-storage elements, as appropriate.

Figure 5:
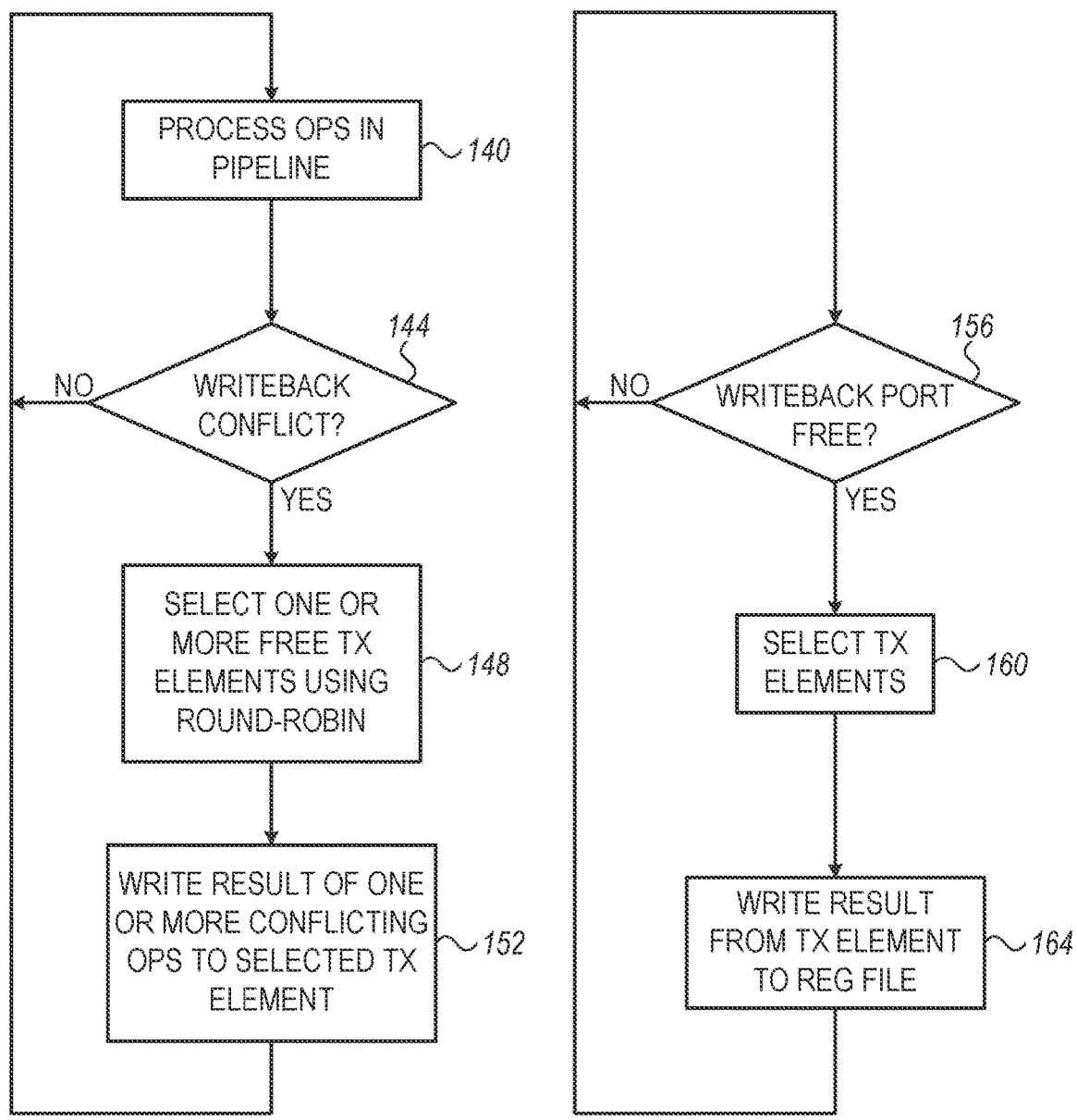
FIG. 5 is a flow chart that schematically illustrates a method for mitigating writeback conflicts, in accordance with an embodiment that is described herein.

FIG. 5 is a flow chart that schematically illustrates a method for mitigating writeback conflicts, carried out by writeback logic 124 of processor 30, in accordance with an embodiment that is described herein. The method of FIG. 5 includes two sub-processes that are typically carried out in parallel. In the first sub-process, depicted on the left-hand side of the figure, writeback logic 124 detects writeback conflicts and stores results of conflicting ops in TX elements 128. In the second sub-process, depicted on the right-hand side of the figure, writeback logic 124 writes-back temporarily-stored results from TX elements 128 to register file 114.

The first sub-process (on the left-hand side of FIG. 5) begins with the processing pipeline of processor 30 processing program ops, at a program-op processing stage 140. At a conflict checking stage 144, writeback logic 124 checks whether a writeback conflict exists, e.g., whether two or more ops will be ready for writeback in the same cycle. In an example embodiment, writeback logic 124 checks for a conflict one or more cycles before the actual cycle in which the conflict will occur. For example, when performing the issue stage for a given op ("IS" in FIG. 3), the stage that determines the processing latency of the op, logic 124 may check whether a previous op will become ready for write back simultaneously with the given op.

If no conflict is detected, the method loops back to stage 140. If a writeback conflict is detected, writeback logic 124 selects one or more free TX elements 128, at a storage-element selection stage 148. In the present example, writeback logic 124 selects a free TX element 128 using a Round-Robin scheme. Alternatively, however, any other suitable scheduling or selection criterion can be used.

At a temporary storage stage 152, writeback logic 124 writes one or more of the results of the conflicting ops (one or more of the "simultaneous results") to the selected TX element or elements 128. The method then loops back to stage 140.

The second sub-process (on the right-hand side of FIG. 5) begins with writeback logic 124 checking whether the writeback port of the processing pipeline is free in the current clock cycle, at a port checking stage 156. If not (e.g., because a result is to be written from the pipeline to the register file in the current cycle), the method loops back to stage 156.

If the writeback port is free, writeback logic 124 selects a result among the results stored in TX elements 128, at a result selection stage 160. In the present example, as explained above with regard to FIG. 3, each TX element is assigned a respective slot (cycle) in a cyclic time-division schedule, and logic 124 selects the TX element whose slot occurs in the current cycle. Alternatively, writeback logic 124 may select the result to be written-back using any other suitable selection criterion.

At a result write-back stage 164, writeback logic 124 writes the selected result from the respective TX element 128 to register file 114. The method loops back to stage 156.

Providing Operands to Pipeline Ops from TX Elements

In some embodiments, writeback logic 124 is further configured to provide results, which are temporarily-stored in TX elements 128, as inputs (operands) to ops that are pending for execution in the processing pipeline. When possible, it is typically preferable to read an operand from a TX element 128 than from register file 114, because the former readout consumes less power.

Consider, for example, op 130C in FIG. 3 above. As seen, the result of op 130C is written to TX element TC. This value remains in TX element TC for four cycles before it is committed to register file 114. In the present context, op 130C is referred to as the "producer" of the result. The time window (in the present example four cycles) during which the result is available in the TX element is referred to as the "bypass window" of this result. If another op in the pipeline (referred to as a "consumer" op) requests this value as an operand during the bypass window, it is possible to provide the value to the consumer op from the TX element rather than from the register file.

In some embodiments, writeback logic 124 includes circuitry that determines (e.g., predicts) the beginning and end of the bypass window for a given consumer op. Upon detecting a consumer op that is to require the result of the producer op, writeback logic 124 serves the result to the consumer op from the TX element 128. In this manner, fewer results are read from register file 114, and power consumption is reduced. In some embodiments, the same result can be served to multiple consumer ops during the bypass window.

Additional Embodiments and Variations

The configurations of SOC 10, processor 30, writeback logic 124 and their components, as illustrated in FIGS. 1, 2 and 4 above, are example configurations that are chosen purely for the sake of conceptual clarity. Any other suitable configurations can be used in alternative embodiments. The different components of SOC 10, processor 30, writeback logic 124 may be implemented using suitable hardware or firmware, such as in one or more Application-Specific Integrated Circuits (ASICs) or Field-Programmable Gate Arrays (FPGAs), using software, or using a combination of hardware and software elements.

Although the embodiments described herein mainly address general-purpose processors, the methods and systems described herein can also be used for mitigating writeback conflicts in other processing devices, such as in Graphics Processing Units (GPU), Artificial Intelligence (AI) accelerators, vector processors and the like.

Figure 6:
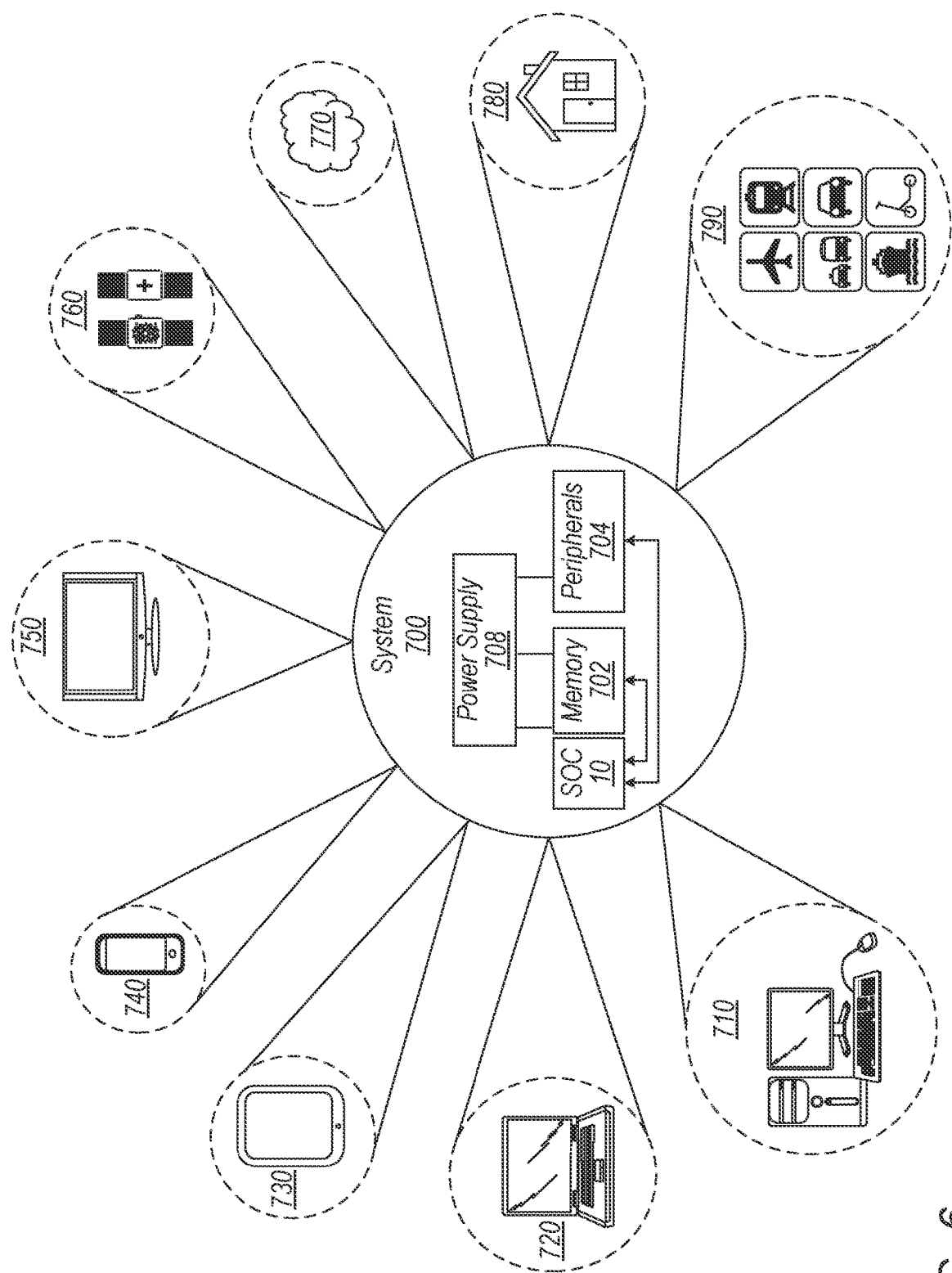
FIG. 6 is a block diagram that schematically illustrates a system, in accordance with an embodiment that is described herein.

FIG. 6 is a block diagram that schematically illustrates a system 700, in accordance with an embodiment that is described herein. In the illustrated embodiment, the system 700 includes at least one instance of a system on a chip (SOC) 10 coupled to one or more peripherals 704 and an external memory 702. A power supply (PMU) 708 is provided which supplies the supply voltages to the SOC 10 as well as one or more supply voltages to the memory 702 and/or the peripherals 154. In some embodiments, more than one instance of the SOC 10 (e.g., the SOCs 10A-10q) may be included (and more than one memory 702 may be included as well). The memory 702 may include the memory 12 illustrated in FIG. 2, in an embodiment.

The peripherals 704 may include any desired circuitry, depending on the type of system 700. For example, in one embodiment, the system 704 may be a mobile device (e.g., personal digital assistant (PDA), smart phone, etc.) and the peripherals 704 may include devices for various types of wireless communication, such as Wi-Fi, Bluetooth, cellular, global positioning system, etc. The peripherals 704 may also include additional storage, including RAM storage, solid state storage, or disk storage. The peripherals 704 may include user interface devices such as a display screen, including touch display screens or multitouch display screens, keyboard or other input devices, microphones, speakers, etc. In other embodiments, the system 700 may be any type of computing system (e.g., desktop personal computer, laptop, workstation, net top etc.).

The external memory 702 may include any type of memory. For example, the external memory 702 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g., LPDDR, mDDR, etc.), etc. The external memory 702 may include one or more memory modules to which the memory devices are mounted, such as single inline memory modules (SIMMs), dual inline memory modules (DIMMs), etc. Alternatively, the external memory 702 may include one or more memory devices that are mounted on the SOC 10 in a chip-on-chip or package-on-package implementation.

As illustrated, system 700 is shown to have application in a wide range of areas. For example, system 700 may be utilized as part of the chips, circuitry, components, etc., of a desktop computer 710, laptop computer 720, tablet computer 730, cellular or mobile phone 740, or television 750 (or set-top box coupled to a television). Also illustrated is a smartwatch and health monitoring device 760. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 700 may further be used as part of a cloud-based service(s) 770. For example, the previously mentioned devices, and/or other devices, may access computing resources in the cloud (i.e., remotely located hardware and/or software resources). Still further, system 700 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 6 is the application of system 700 to various modes of transportation. For example, system 700 may be used in the control and/or entertainment systems of aircraft, trains, buses, cars for hire, private automobiles, waterborne vessels from private boats to cruise liners, scooters (for rent or owned), and so on. In various cases, system 700 may be used to provide automated guidance (e.g., self-driving vehicles), general systems control, and otherwise. These any many other embodiments are possible and are contemplated. It is noted that the devices and applications illustrated in FIG. 6 are illustrative only and are not intended to be limiting. Other devices are possible and are contemplated.

Figure 7:
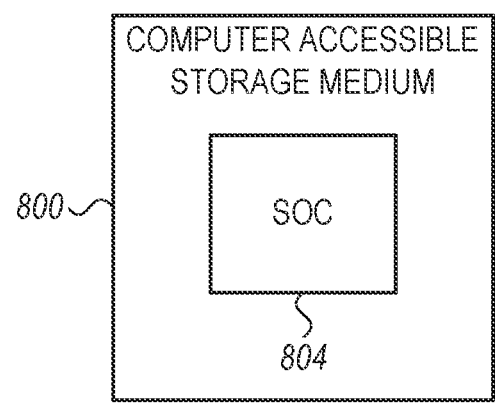
FIG. 7 is a block diagram that schematically illustrates a computer-readable storage medium, in accordance with an embodiment that is described herein.

FIG. 7 is a block diagram that schematically illustrates a computer-readable storage medium 800, in accordance with an embodiment that is described herein. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g., synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 800 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 800 in FIG. 7 may store a database 804 representative of the SOC 10. Generally, the database 804 may be a database which can be read by a program and used, directly or indirectly, to fabricate the hardware including the SOC 10. For example, the database may be a behavioral-level description or register-transfer level (RTL) description of the hardware functionality in a high-level design language (HDL) such as Verilog or VHDL. The description may be read by a synthesis tool which may synthesize the description to produce a netlist including a list of gates from a synthesis library. The netlist includes a set of gates which also represent the functionality of the hardware including the SOC 10. The netlist may then be placed and routed to produce a data set describing geometric shapes to be applied to masks. The masks may then be used in various semiconductor fabrication steps to produce a semiconductor circuit or circuits corresponding to the SOC 10. Alternatively, the database 804 on the computer accessible storage medium 800 may be the netlist (with or without the synthesis library) or the data set, as desired.

While the computer accessible storage medium 800 stores a representation of the SOC 10, other embodiments may carry a representation of any portion of the SOC 10, as desired, including any subset of the components shown in FIG. 2. The database 804 may represent any portion of the above.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(*f*) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement, The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

The invention claimed is:

1. A processor, comprising:
   a processing pipeline, configured to process program operations and to write, to a result storage, up to a predefined maximal number of results of the processed program operations per clock cycle;
   a plurality of result-storage elements, configured to store respective ones of the results; and
   writeback circuitry, configured to:
      detect a writeback conflict event in which the processing pipeline produces simultaneous results that exceed the predefined maximal number of results, for writing to the result storage in a same clock cycle;
      in response to detecting the writeback conflict event, temporarily store at least a given result, from among the simultaneous results, in a given result-storage element, and
      subsequently write the temporarily-stored given result from the given result-storage element to the result storage,
   wherein the writeback circuitry is further configured to:
      identify an operation that is processed in the processing pipeline and requires an input that is available in the result-storage elements;
      predict a beginning and an end of a range of clock cycles during which the input will be available in the result-storage elements;
      determine a time at which the operation will require the input; and
      if the time falls within the predicted range of clock cycles, provide the input to the operation from the result-storage elements.

2. The processor according to claim 1, wherein the writeback circuitry is configured to retain the given result in the given result-storage element at least until the given result is written back from the given result-storage element to the result storage.

3. The processor according to claim 1, wherein the writeback circuitry is configured to assign the result-storage elements for storage of simultaneous results using Round-Robin scheduling.

4. The processor according to claim 1, wherein the simultaneous results are results of two or more operations that differ in processing latency in the processing pipeline.

5. The processor according to claim 1, wherein the writeback circuitry comprises:
   multiplexing circuitry, which is configured to receive as inputs at least (i) one or more results from one or more execution units of the processing pipeline, and (ii) one or more temporarily-stored results from the result-storage elements; and
   selection circuitry, configured to control the multiplexing circuitry to select, in a given clock cycle, one of the inputs for writing to the result storage.

6. A method, comprising:
   in a processing pipeline of a processor, processing program operations and writing, to a result storage, up to a predefined maximal number of results of the processed program operations per clock cycle;
   detecting a writeback conflict event in which the processing pipeline produces simultaneous results that exceed the predefined maximal number of results, for writing to the result storage, in a same clock cycle; and in response to detecting the writeback conflict event,
temporarily storing at least a given result, from among the simultaneous results, in a given result-storage element selected from among multiple result-storage elements, and subsequently writing the temporarily-stored given result from the given result-storage element to the result storage, wherein the method further comprises:
identifying an operation that is processed in the processing pipeline and requires an input that is available in the result-storage elements;
predicting a beginning and an end of a range of clock cycles during which the input will be available in the result-storage elements;
determining a time at which the operation will require the input; and
if the time falls within the predicted range of clock cycles, providing the input to the operation from the result-storage elements.

7. The method according to claim 6, wherein temporarily storing the given result comprises retaining the given result in the given result-storage element at least until the given result is written back from the given result-storage element to the result storage.

8. The method according to claim 6, and comprising assigning the result-storage elements for storage of simultaneous results using Round-Robin scheduling.

9. The method according to claim 6, wherein the simultaneous results are results of two or more operations that differ in processing latency in the processing pipeline.

10. The method according to claim 6, wherein writing from the result-storage elements to the result storage comprises:
receiving as inputs at least (i) one or more results from one or more execution units of the processing pipeline, and (ii) one or more temporarily-stored results from the result-storage elements; and
selecting, in a given clock cycle, one of the inputs for writing to the result storage.

11. A system comprising a plurality of interconnected processors, wherein at least one of the processors comprises:
a processing pipeline, configured to process program operations and to write, to a result storage, up to a predefined maximal number of results of the processed program operations per clock cycle;
a plurality of result-storage elements, configured to store respective ones of the results; and
writeback circuitry, configured to:
detect a writeback conflict event in which the processing pipeline produces simultaneous results that exceed the predefined maximal number of results, for writing to the result storage in a same clock cycle;
in response to detecting the writeback conflict event,
temporarily store at least a given result, from among the simultaneous results, in a given result-storage element, and
subsequently write the temporarily-stored given result from the given result-storage element to the result storage,
wherein the writeback circuitry is further configured to:
identify an operation that is processed in the processing pipeline and requires an input that is available in the result-storage elements;
predict a beginning and an end of a range of clock cycles during which the input will be available in the result-storage elements;
determine a time at which the operation will require the input; and
if the time falls within the predicted range of clock cycles, provide the input to the operation from the result-storage elements.

12. The system according to claim 11, wherein the plurality of interconnected processors are implemented as a System-on-Chip (SOC).

13. The system according to claim 11, further comprising a display device and one or more input devices.

14. The processor according to claim 1, wherein the processing pipeline comprises multiple execution units configured to process the program operations and produce the results, and wherein the writeback circuitry is configured to store, in the result-storage elements, results produced by two or more of the multiple execution units.

15. The method according to claim 6, wherein processing the program operations comprises producing the results using multiple execution units in the processing pipeline, and wherein temporarily storing the given result for each writeback conflict comprises storing, in the result-storage elements, results produced by two or more of the multiple execution units.

* * * * *